United States Patent [19]
Hawley

[11] 3,838,937

[45] Oct. 1, 1974

[54] COMBINATION DRILL AND COUNTERBORE

[76] Inventor: Richard Hawley, 2075 Farrington, St. Paul, Minn. 55113

[22] Filed: Jan. 26, 1973

[21] Appl. No.: 326,765

[52] U.S. Cl. ............................. 408/193, 408/226
[51] Int. Cl. .................... B23b 51/00, B23b 51/10
[58] Field of Search ............ 408/191, 193, 224, 226

[56] References Cited
UNITED STATES PATENTS
2,826,104   3/1958   Morin ................................ 408/193
2,927,614   3/1960   Ransom ............................. 408/193

Primary Examiner—Francis S. Husar

[57] ABSTRACT

A combination drill and counterbore, counterbore portion of invention having cutting means integral with one end, other end of a size for engagement in appropriate drill chuck, said counterbore having an axial bore extending into counterbore body. Said bore of a diameter to accept appropriate drill bit. Drill bit is provided with a flat section to assure positive securing of drill bit at proper point of extension. Said securing is accomplished by a setscrew which is threaded into a hole perpendicular to axial bore and located immediately behind cutting means on counterbore shank. Said screw when tightened bears upon aforesaid flat section of drill bit.

1 Claim, 5 Drawing Figures

PATENTED OCT 1 1974　　　　　　　　　　　　　　　3,838,937

COMBINATION DRILL AND COUNTERBORE

BACKGROUND OF INVENTION

1. Field of Invention

This invention relates to a cutting tool for counterboring combined with a drill bit for accomplishing initial bore.

2. Description of Prior Art

Present counterboring operations require the use of two separate tools to accomplish the initial hole boring and the following counterboring action.

SUMMARY OF INVENTION

The primary object of this invention is to provide a combination tool which allows the performance of two operations normally requiring two separate tools. The two operations are the initial boring of a hole, and the counterboring of said hole. This combination of operations would substantially reduce time and effort expended and thus reduce machine costs.

Another object to the present invention is to provide a cutting tool for counterboring with adjustable drill extension to allow precise control of hole depth.

DESCRIPTION OF PREFERRED EMBODIMENTS

Figure 1:
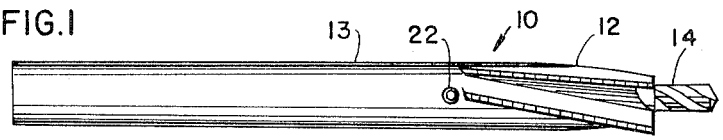
FIG. 1 is a side elevation of the assembled invention.
Figure 2:
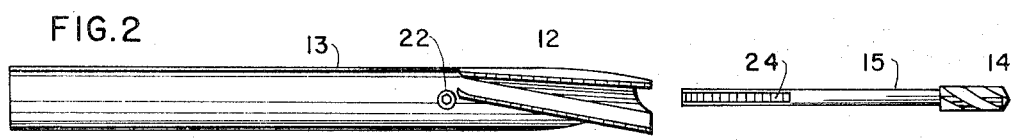
FIG. 2 is a view similar to FIG. 1 with drill removed from position in counterbore.
Figure 3:
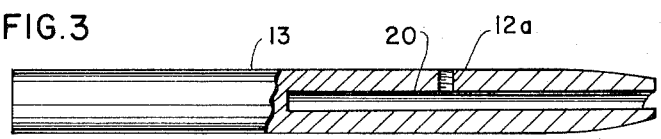
FIG. 3 is a longitudinal partial sectional view taken substantially upon the plane passing along section line disposed on the longitudinal axis of the invention.
Figure 4:
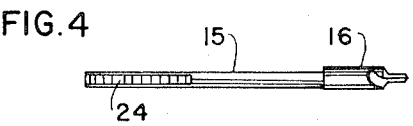
FIG. 4 is a side view of the center drill.
Figure 5:
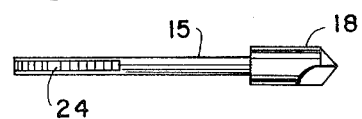
FIG. 5 is a side view of an 82° countersink.

Referring now to the drawings, wherein 10 is the invention, comprised of two major elements, counterbore 12, and twist drill 14. Center drill 16, and countersink 18 are optional embodiments of the design.

Counterbore body 13 is provided with axial bore 20, extending suitable distance into said body, also having female screw threads 12a, said threads accepting locking set screw 22.

Shank portion 15 of each embodiment is provided with an elongated flat area 24, said flat area being locking area for said locking set screw, and being of sufficient length to allow maximum length adjustment relative to drill diameters used.

This invention can be made to cover the full range of commercial counterbore sizes, each having its own range of drill, countersink and center drill sizes.

I claim:

1. A combination drill and counterbore tool device adapted for use in the initial boring of a hole and the counterboring thereof, said device comprising an elongated cylindrical rod shaped body member having opposing first and second ends, said body member being of substantially the same diameter over substantially its complete length, said first end portion of said body member adapted to be engaged in a suitable chuck of a drill tool operable in a manner to effect the rotation of said body member about its longitudinal axis, a counterbore member formed integrally with said second end portion of said body member, said counterbore member including a plurality of circumferally spaced apart radially extending projections with each projection having its longitudinal edge extending diagonally relative to said body member from a point inwardly of said body member diagonally outwardly therefrom to a point lying substantially co-planar with said second end of said body member, said points of said edges lying co-planar with said second end of said body member defining a circle having a diameter greater than the diameter of said body member, an elongated axially extending circular bore extending through said second end portion of said body member and opening out of said second end, an interiorly threaded aperture extending radially through said second end portion of said body member intermediate said bore and the exterior surface of said body member and disposed intermediate the ends of said bore, said aperture disposed at a position rearwardly of said inner points of said longitudinal edges of said counterbore member, an elongated cylindrical shaped set screw having threads disposed about its circumferal side walls and being of a size and configuration adapted to be threadedly received in said threaded aperture, a recessed drive head disposed at the end of said set screw adapted to be visible exteriorly of said body member and adapted to receive therein a suitable drive tool to effect the rotation of said set screw in opposite directions about its longitudinal axis for effecting the protrusion or retraction of said set screw from said axial bore; an axially elongated drill bit including an axially elongated cylindrical shank of a diameter adapted to be slidingly received in said bore of said body member, said shank having an inner end and an outer end, said outer end having formed integrally therewith a drilling member of spirally spaced apart lands and grooves, said drill member being of a larger diameter than the diameter of said shank, said shank inner end portion having formed longitudinally along a side thereof a flattened portion adapted to be disposed substantially perpendicular to the axis of said threaded aperture in said body member when said drill bit is inserted into said axial bore with said set screw adapted to adjustably engage said flattened portion to control the length of said drill bit which projects axially outwardly of said second end of said body member thus providing accurate control of the depth of the hole bored by said drill member relative to said counterbore member whereby a hole may be drilled in a workpiece with said hole being simultaneously counterbored all in a single operation through the use of said single tool device.

* * * * *